J. K. LEEDY.
Bee Hive.
No. 24,745.  Patented July 12, 1859.
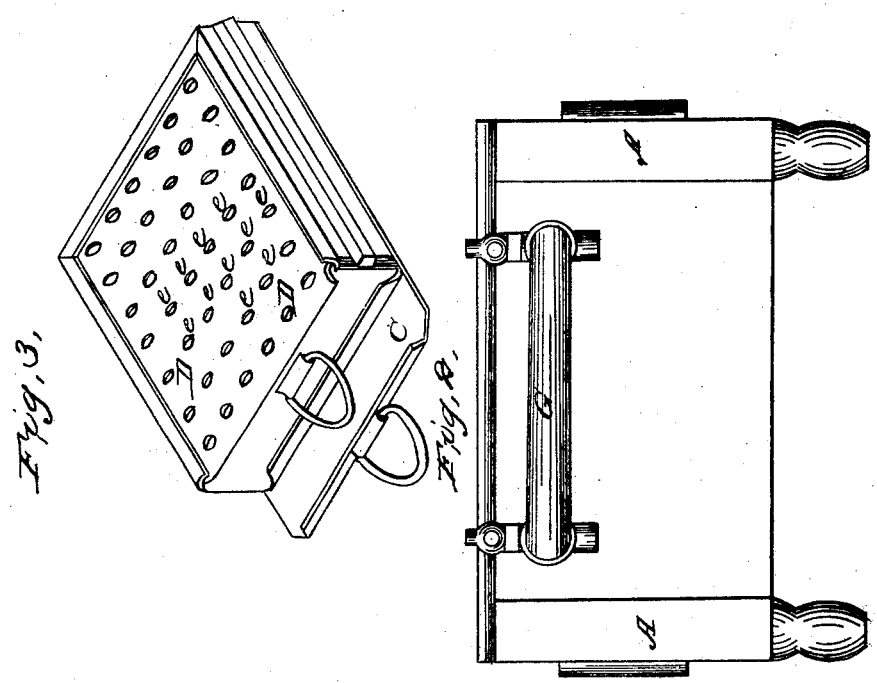
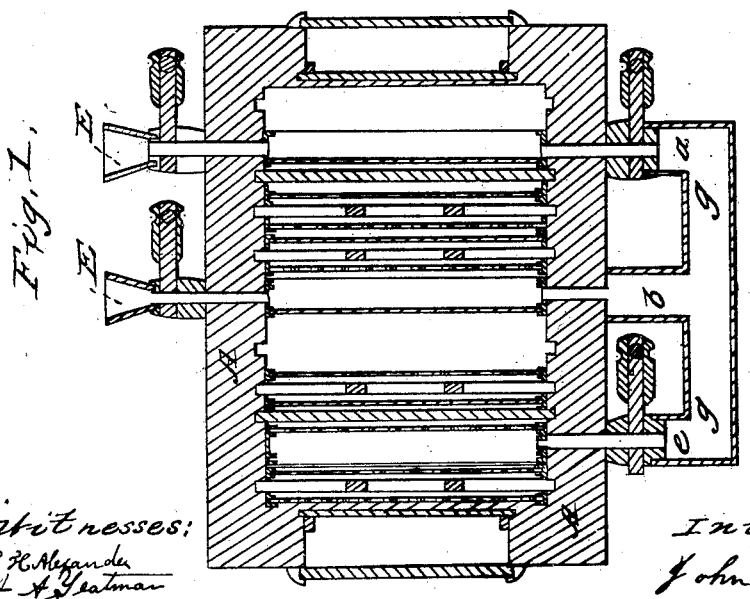

UNITED STATES PATENT OFFICE.

JOHN K. LEEDY, OF WOODSTOCK, VIRGINIA.

BEEHIVE.

Specification of Letters Patent No. 24,745, dated July 12, 1859.

*To all whom it may concern:*

Be it known that I, JOHN K. LEEDY, of Woodstock, in the county of Shenandoah and State of Virginia, have invented certain new and useful Improvements in Beehives; and I do hereby declare that the following is a full, clear, and exact description of the same, reference being had to the annexed drawings and the letters of reference marked thereon.

The nature of my invention consists in the arrangement and construction of certain devices the peculiarities of which will be hereinafter fully set forth.

To enable others skilled in the art to make and use my invention I will now describe its construction and operation.

In the drawings Figure 1 is a top view. Fig. 2 is a side elevation. Fig. 3 is a view of the box, showing also the perforated slide (D) and the slide $c$.

(A) represents a longitudinal box or hive, which is divided into three compartments (as shown by sectional lines in Fig. 1), the middle one of which contains about three times the space that either of the end ones do.

(B) represents a tin frame with its sides turned to form grooves for the admission of the slides (C) and (D). A sufficient number of these frames are made to fill up all three of the compartments. Those designed for the middle compartment have a slatted frame of wood inserted in them to furnish the bees a suitable place to build their comb.
At the bottom of said frame are rectangular apertures left, so that when the frames are filled with honey the bees may still have passages across the hive.

(C) is a slide with a ring attached at the top to enable it being drawn out easily.

(D) is a perforated slide, the advantage of which will be hereafter more fully set forth.

The tin frames which are designed for the end compartments are constructed similar to those already described and shown in the drawings, but they have no wooden frame in them, and are used only when the bees are swarming.

($a$ $b$ $c$) are three pipes which enter the hive near the top. Said pipes are connected by pipe G, as fully shown in Fig. (1). ($a$ and $c$) have the ordinary faucet or stop cock inserted through them in order that all communication between the end compartments may be opened or shut at pleasure. (E E) are likewise two pipes, with bell or funnel shaped mouths. Said pipes have also inserted through them faucets or stop cocks.

In the ends of the hive are glass doors to enable one to perceive the operations of the bees.

My invention is designed to inaugurate a new method in the art of preserving bees and expedite the process of taking the honey. The hive may be so constructed as to represent a handsome piece of furniture, which can then be placed in your own room or parlor without the slightest possibility of the bees ever disturbing you. The honey can be removed without fear and you can at all times have the operations of the bees immediately under your own observation and superintendence.

The pipes (E E) are designed to protrude on the outside of the wall to furnish the bees a free passage and the same advantages that they would possess from the ordinary mode of treating them. The operation of my hive is as follows: A suitable number of boxes, such as has been described, being constructed, they are adjusted in their proper places. The ones designed for the end compartments are simply a tin frame with holes in them opposite the pipe holes, but with each side turned to that the slide ($c$) can be slipped on to confine the bees. The boxes for the middle compartment when inserted in the hive have the perforated slide (D) on both sides, so that the bees can pass from one to the other. Said compartment should be entirely filled with these boxes. When said boxes are filled with honey and you desire to take the honey slip the slide ($c$) on over the slide (D), which separates the bees from the box. The box may then be drawn out and the honey removed.

The pipes ($a$, $b$, $c$) are designed for the purpose of conveying the bees from one compartment to the other, when they swarm, and the faucets serve to confine them to either of the compartments desired.

Having thus fully described my invention what I claim and desire to secure by Letters Patent is—

1. The boxes (c,) constructed and arranged in the manner and for the purpose herein specified.

2. I claim in combination with the boxes (c,) the pipes E, E, and *a b c*, and their faucets, all arranged in the manner and for the purpose herein set forth.

JOHN K. LEEDY.

Witnesses:
A. A. GEATMAN,
T. H. ALEXANDER.